United States Patent [19]

Ito et al.

[11] Patent Number: 5,936,685
[45] Date of Patent: Aug. 10, 1999

[54] LIQUID CRYSTAL DISPLAY DEVICE WITH PIXEL ELECTRODE OVERLAPPING DRAIN WIRING

[75] Inventors: Masahiro Ito; Susumu Ohi, both of Tokyo, Japan

[73] Assignee: NEC Corporation, Tokyo, Japan

[21] Appl. No.: 08/607,493

[22] Filed: Feb. 27, 1996

[30] Foreign Application Priority Data

Feb. 28, 1995 [JP] Japan ..................................... 7-40224

[51] Int. Cl.$^6$ .............................................. G02F 1/1343
[52] U.S. Cl. ............................................................. 349/38
[58] Field of Search ................................. 349/42, 44, 38

[56] References Cited

U.S. PATENT DOCUMENTS 5,604,358  2/1997  Kim ............................................ 349/42

*Primary Examiner*—William L. Sikes
*Assistant Examiner*—James Dudek
*Attorney, Agent, or Firm*—Young & Thompson

[57] ABSTRACT

A gate electrode is disposed on a transparent insulating substrate, a gate wiring is connected to the gate electrode, and source and drain electrodes are disposed on a semiconductor thin film which is disposed on the gate electrode interposing an insulating film formed on the gate electrode, thereby forming a thin film transistor. In an active matrix type liquid crystal display device using this thin film transistor, a transparent pixel electrode connected to the source electrode is formed on the insulating film, and in a region where a drain wiring is adjacent to the transparent pixel electrode, the drain wiring is disposed under the insulating film on which the transparent pixel electrode is formed, whereby a lateral direction electric field caused by the drain wiring is reduced and reverse tilt region due to the lateral direction electric field is narrowed. Therefore, a penetration of a disinclination to the transparent pixel electrode is controlled so that an increase in an opening ratio can be achieved.

6 Claims, 7 Drawing Sheets

LIQUID CRYSTAL DISPLAY DEVICE WITH PIXEL ELECTRODE OVERLAPPING DRAIN WIRING

BACKGROUND OF THE INVENTION

1. Field of the Invention

The present invention relates to a liquid crystal display device, more particularly to an active matrix type liquid crystal display device using a thin film transistor as a switching element.

2. Description of the Prior Art

In an active matrix type liquid crystal display device (hereinafter referred to as an LCD) driven by a thin film transistor (hereinafter, referred to as a TFT), the TFT having a reverse stagger type structure (a bottom gate type structure) has been used in general.

As shown in FIGS. 1A and 1B, the LCD has been heretofore constituted of a gate electrode 2 formed on a transparent insulating substrate 12, a gate wiring 1 connected to the gate electrode 2, a semiconductor thin film 5 formed on the gate electrode 2 via an insulating film 10, drain and source electrodes 4 and 7 formed so as to be connected to the semiconductor thin film 5, a drain wiring 3 formed integrally with the drain electrode 4, which crosses the gate wiring 1 interposing the insulating film 10, and a transparent pixel electrode 8 formed so as to be connected to the source electrode 7.

In this conventional LCD, a lateral direction electric field between the transparent pixel electrode and the drain wiring is produced, because the transparent pixel electrode and the drain electrode are made of the same layer. It should be noted that when a liquid crystal is applied with a voltage between a pixel electrode and an electrode facing the pixel electrode, both being formed on a TFT substrate, a direction from the pixel electrode to the opposing electrode is defined as a longitudinal direction. A stronger lateral direction electric filed is produced when a distance between the pixel electrode and the drain wiring is reduced as the LCD is micronized to a higher degree.

With reference to FIGS. 2 and 3, when a liquid crystal is supplied with a voltage, a liquid crystal normally rises into a pretilt direction 15 which is caused according to a rubbing direction for an orientation film. However, when the aforementioned strong lateral electric field is present in reverse to the pretilt direction, the liquid crystal is oriented into this lateral electric field direction. As a result, in the region where the electric field opposite to the pretilt direction is present, the liquid crystal 13 rises to a reverse direction to a normal direction, that is called a reverse tilt state. When the reverse tilt state is caused, a transition region called a disclination 16 is generated at a boundary between the normal tilt region, called a normal tilt state, and the region of the reverse tilt 17, as shown in FIG. 3. This disclination region (bounded by lines 16 in FIG. 3) transmits light unfortunately when a normally black LCD operates a black display. Hence, is display contrast is deteriorates.

To shield the aforementioned disclination region, and with reference to FIG. 1C, a black matrix (hereinafter referred to as a BM) layer 20 made of a chromium metal layer or other materials for shielding light, which is formed on a substrate 19 facing the TFT, has been heretofore formed. The BM layer 20 has been formed with an overlapping margin of a considerable width over the pixel electrode to shield the disclination regions, taking into consideration the overlapping precision of the facing substrate with the TFT.

For this reason, an opening area ratio of the BM layer to a normal tilt region (an opening ratio) is reduced, thereby undesirably reducing display brightness. To compensate for the reduction of display brightness, electric power consumption of the LCD increases.

Furthermore, since in the presence of the afore-mentioned strong lateral direction electric field, the disclination area penetrates deeply into the inner pixel electrodes, the BM region has to be formed wider to shield the disclination area. Therefore, there has been a problem that the opening ratio decreases still more.

SUMMARY OF THE INVENTION

The first object of the present invention is to provide a liquid crystal display device using a high quality thin-film transistor.

The second object of the present invention is to provide a liquid crystal display with enhanced display contrast.

The third object of the present invention is to provide a liquid crystal display device which can reduce a reverse tilt region thereby preventing a penetration of a disclination region into inner pixel electrodes.

The fourth object of the present invention is to provide a liquid crystal device which can increase an opening area of a black matrix layer thereby increasing an opening ratio of a liquid crystal panel.

The fifth object of the present invention is to provide a liquid crystal device which can enhance a display brightness and can control electric power consumption.

To achieve the above described objects, in a liquid crystal device which comprises a gate electrode disposed on a transparent insulating substrate; a gate wiring connected to the gate electrode; a thin film transistor of a reverse stagger structure, which includes a semiconductor thin film, a source electrode, and a drain electrode, respectively, the semiconductor film being disposed above the gate electrode via an insulating film formed on the gate electrode; a transparent pixel electrode formed on the insulating film, the transparent pixel electrode being connected to the source electrode; and a drain wiring connected to the drain electrode, the improvement wherein the drain wiring is formed under the insulating film on which the transparent pixel electrode is formed.

In the present invention, the transparent pixel electrode is formed on the insulating film, and the drain wiring is formed on the transparent insulating substrate. With such structure, a lateral direction electric field caused by the drain wiring is reduced so that a reverse tilt region due to the lateral direction electric field is narrowed. Hence, penetration of a disclination to the pixel electrode is controlled.

Furthermore, by overlapping an edge of the pixel electrodes with the drain wiring, if the drain wiring is formed of such light shielding materials as Cr, Ta, or Al or the like, the drain wiring functions as a light shielding film. Thus, a BM layer of a facing electrode is not needed in the overlapping region of the drain region with the pixel electrode so that an opening ratio can be increased compared to the conventional light shielding method.

BRIEF DESCRIPTION OF THE DRAWINGS

The above-mentioned and other objects, features, and advantages of the present invention will become more apparent from the following detailed description when taken in conjunction with the accompanying drawings, wherein.

DESCRIPTION OF THE PREFERRED EMBODIMENTS

Figure 1A:
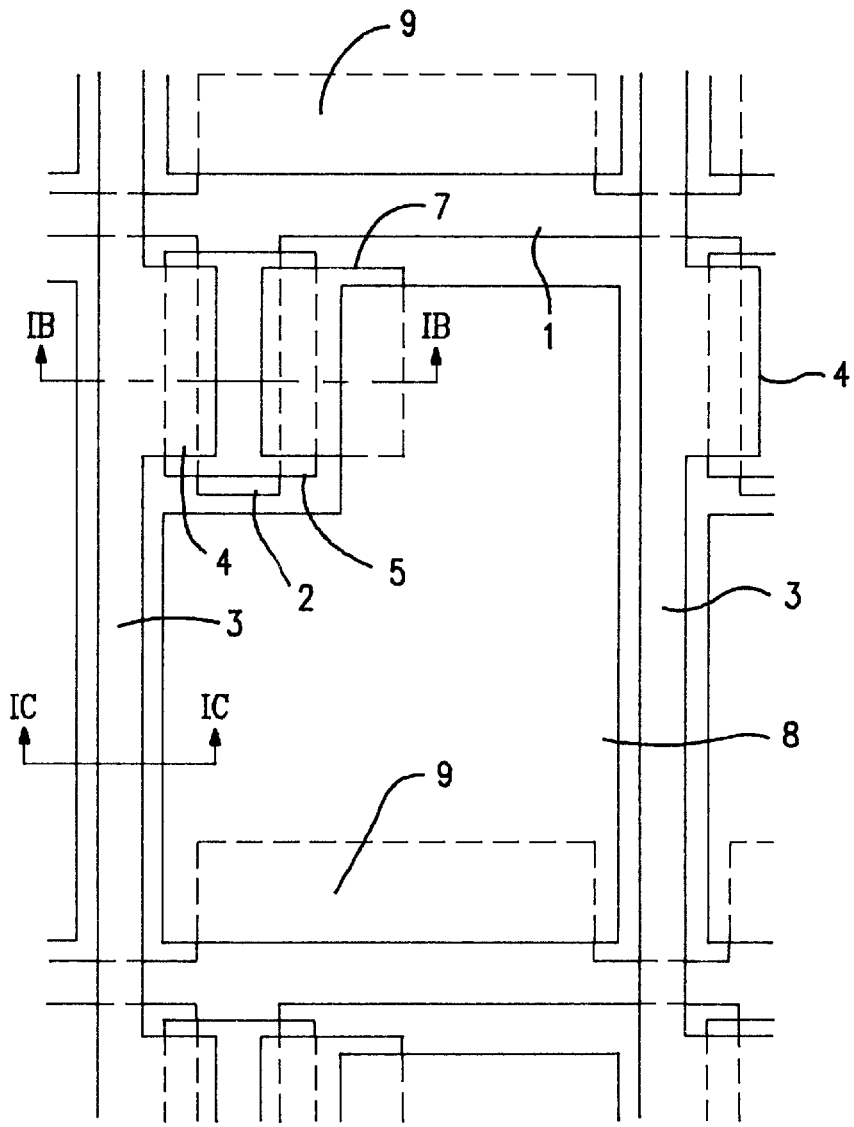
FIG. 1A is a plan view of a conventional liquid crystal device.
Figure 1B:
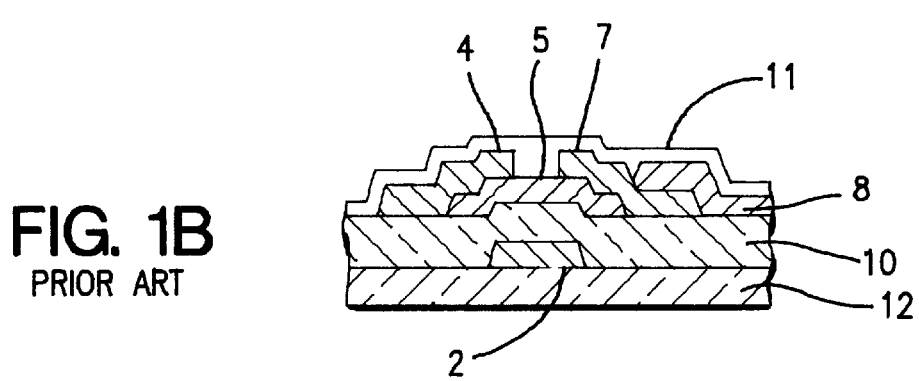
FIG. 1B is a sectional view taken along a line IB—IB of FIG. 1A.

As shown in FIGS. 4A to 4D, a chromium film is deposited on a transparent insulating substrate 12 using a sputtering method, and the film is patterned so that a gate electrode 2, a gate wiring 1, and a drain wiring 3 are formed, respectively. The gate wiring 1 is connected to the gate electrode 2 and comprises a lower electrode of an additional capacitance element 9. Subsequently, an insulating film 10 formed of a silicon nitride (SiNx) film is deposited on the entire surface of the resultant structure including the gate electrode 2, using a CVD method. Thereafter, an amorphous silicon (a-Si) film is deposited on the insulating film 10, and is patterned so that a semiconductor thin film 5 is formed on the insulating film 10 which is located on the gate electrode 2. Next, the insulating film 10 is selectively etched whereby a through hole 6 is formed on the drain wiring 3.

Further, a chromium film is deposited on the surface including the semiconductor thin film 5 and the through hole 6, using a sputtering method. The chromium film is patterned thereby forming a drain electrode 4 which contacts the lower drain wiring 3 via the through hole 6, an upper drain wiring 4a, and a source electrode 7, respectively. The upper drain wiring 4a contacts the drain wiring 3 via the through hole 6, and strides over the gate wiring 1 to connect with the drain electrode 4. Subsequently, an indium tin oxide (ITO) film deposited by the sputtering method is selectively etched. Hence, a transparent pixel electrode 8 which connects with the source electrode 7 is formed. Simultaneously, the aforementioned addition capacitance element 9 is formed. Subsequently, a silicon nitride film is deposited on the entire surface so that a protection film 11 is formed. Liquid crystal is put into the space formed between a pair of substrates 12 and 19. On the facing substrate 19 are formed a BM#20, a color filter 21 and a facing electrode 18.

Figure 5:
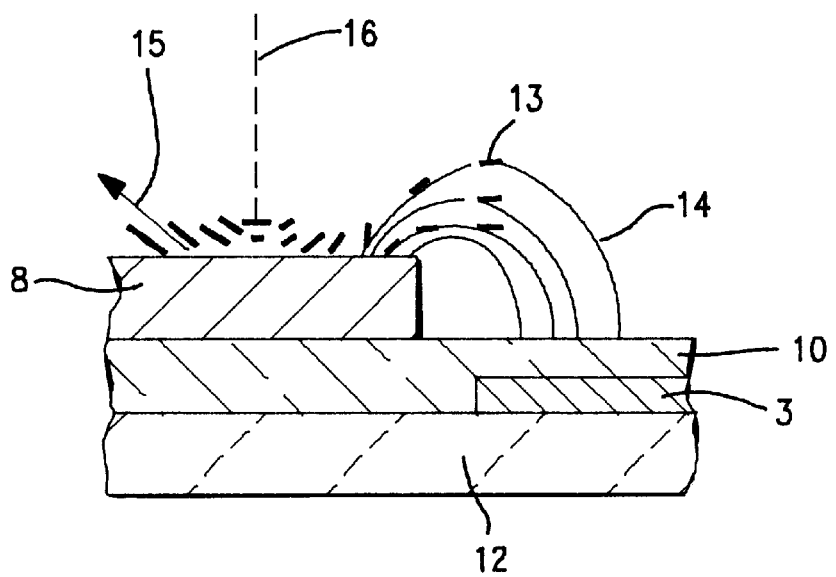
FIG. 5 is a schematic section view showing electric force lines produced between a drain wiring and a transparent pixel electrode, and orientations of liquid crystal molecules of a first embodiment of the present invention.

FIG. 5 is a schematic view showing electric force lines produced between the drain wiring and the transparent pixel electrode, and orientations exhibited by the liquid crystal in the LCD formed according to the first embodiment.

Figure 2:
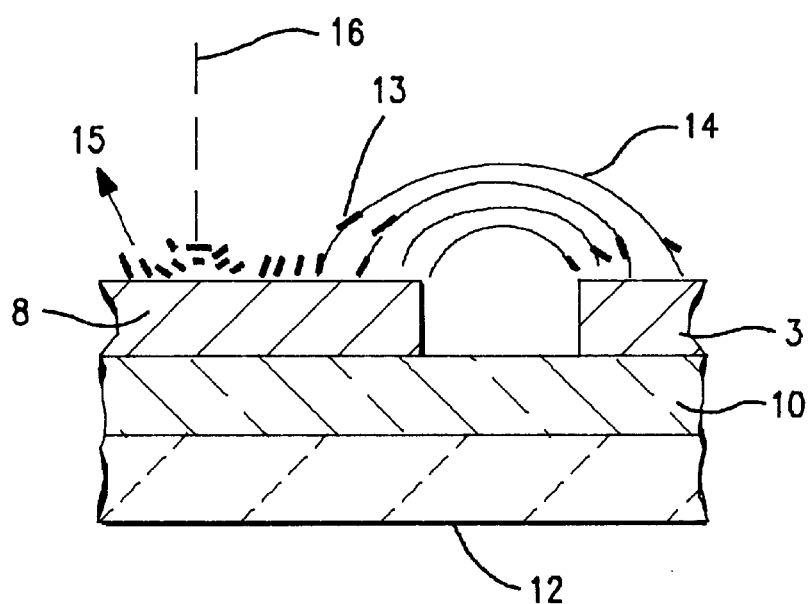
FIG. 2 is a schematic section view showing electric force lines produced between a drain wiring and a transparent pixel electrode of the conventional liquid crystal display device, and orientations of liquid crystal molecules.

As shown in FIG. 5, in the electric force lines 14 the lateral direction electric field is lessened in comparison with the conventional LCD of FIG. 2. The orientations of the liquid crystal come to be influenced strongly by a longitudinal direction electric field between the pixel electrode and the electrode facing thereto (hereinafter referred to as a facing electrode). As a result, as shown in FIG. 6, an area of the reverse tilt region 17 is reduced so that a range of the disclination line 16 is narrowed.

Figure 1C:
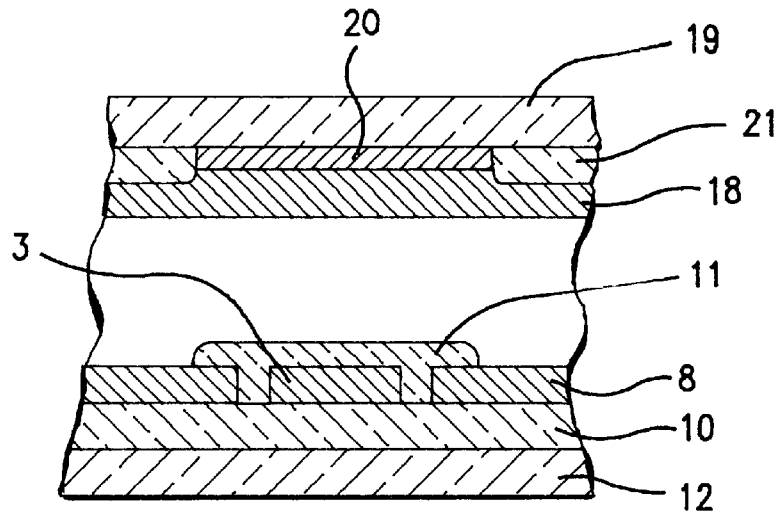
FIG. 1C is a sectional view taken along a line IC—IC of FIG. 1A.
Figure 3:
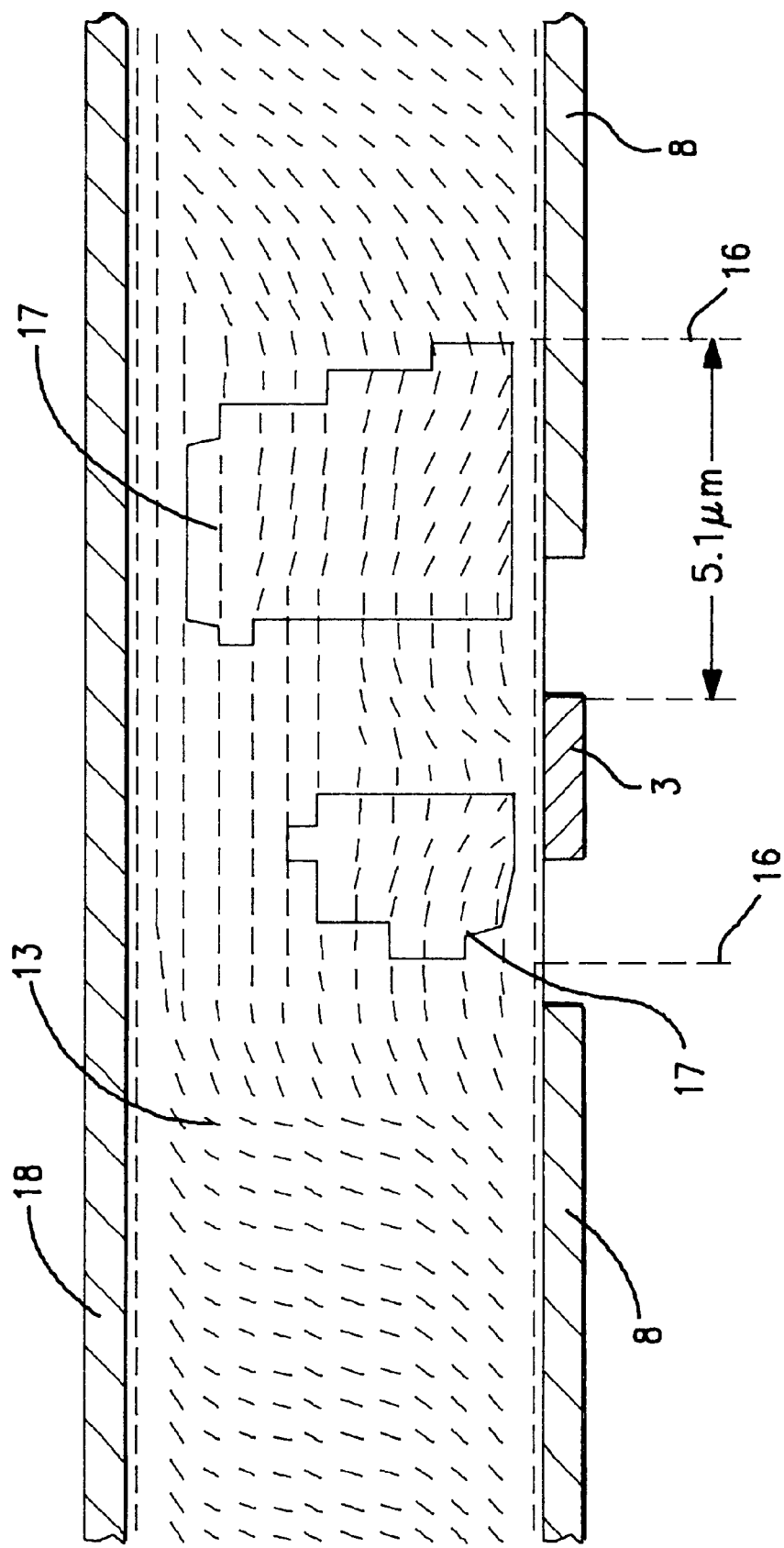
FIG. 3 is a schematic section view showing a result of simulating the orientations of the liquid crystal molecules of the conventional liquid crystal display device.
Figure 6:
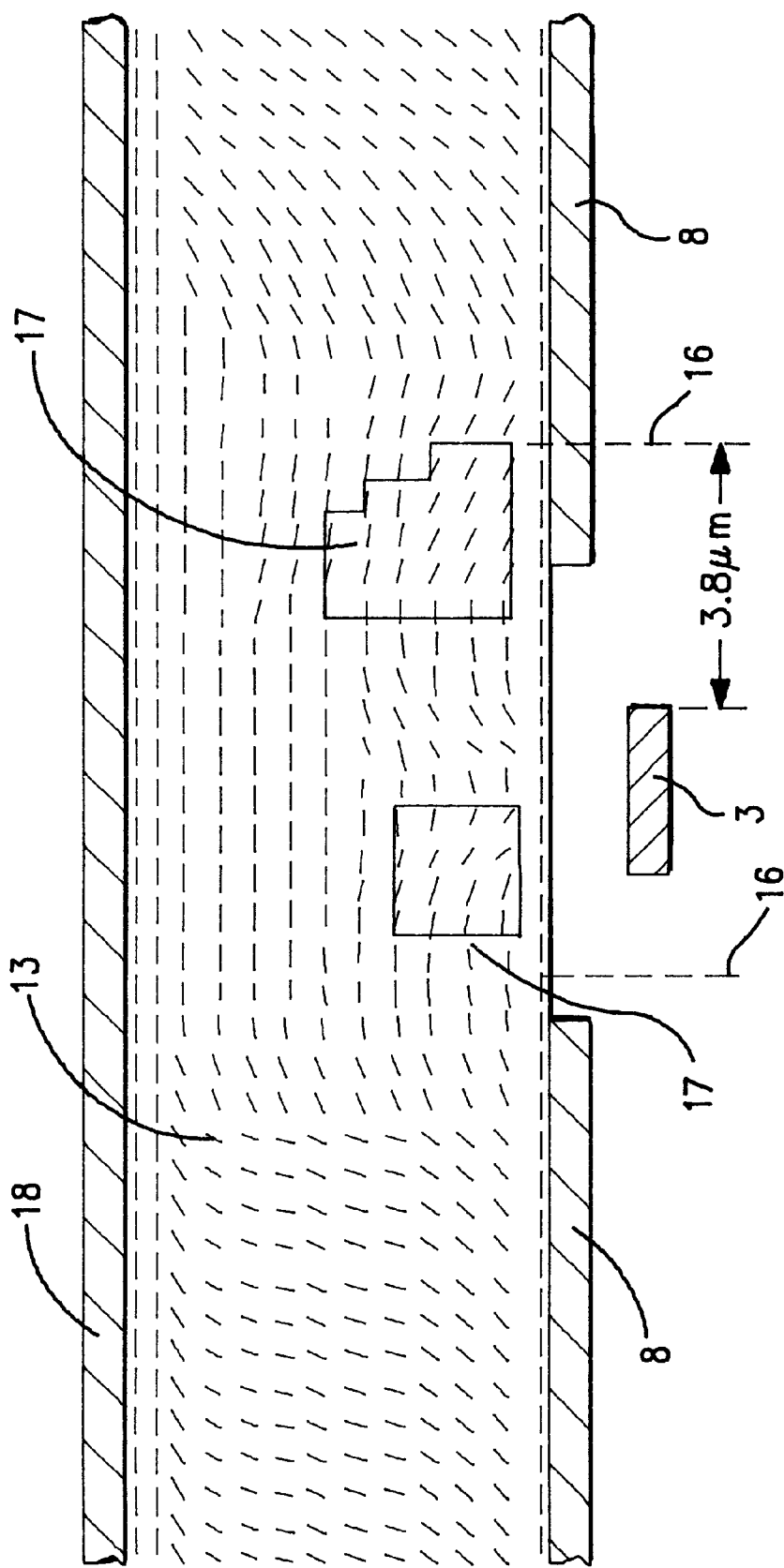
FIG. 6 is a scehmatic section view showing a result of simulating the orientations of the liquid crystal display device of the first embodiment of the present invention.

FIG. 3 and FIG. 6 will be compared with each other, which show the results obtained, utilizing liquid crystal simulation programs, by simulating the orientations of the LCDs according to the conventional and the first embodiment. At this time, the potentials at the facing electrode 18, the transparent pixel electrode 8, and the drain wiring 3 are 9V, 14V, and 4V, respectively. In both of FIGS. 3 and 6, the transparent pixel electrode 8 on the right side is connected to the drain wiring 3 via the TFT, and the transparent pixel electrode 8 on the left side is connected, via another TFT, to another drain wiring (not shown) disposed on the left side of the transparent pixel electrode 8. The orientation films are rubbed from the left side to the right side. The reverse tilt region 17 in this embodiment shown in FIG. 6 is narrower, in comparison with that of the conventional LCD shown in FIG. 3. In the conventional LCD, the distance of the disclination line 16 which penetrates from the edge of the drain wiring 3 to the transparent pixel electrode 8 is 5.1 μm. Compared to this, in the present embodiment, it is 3.8 μm, which is shorter than that of the conventional LCD by 1.8 μm. As described above, it is said that the penetration of the disclination to the pixel electrode will be controlled more effectively. Therefore, the BM layer 20 can be formed to be so small that the opening ratio can be increased. It is apparent that the BM layer 20 of FIG. 1C has a larger width than that of FIG. 4D.

Next, an LCD of a second embodiment of the present invention will be described.

Figure 7A:
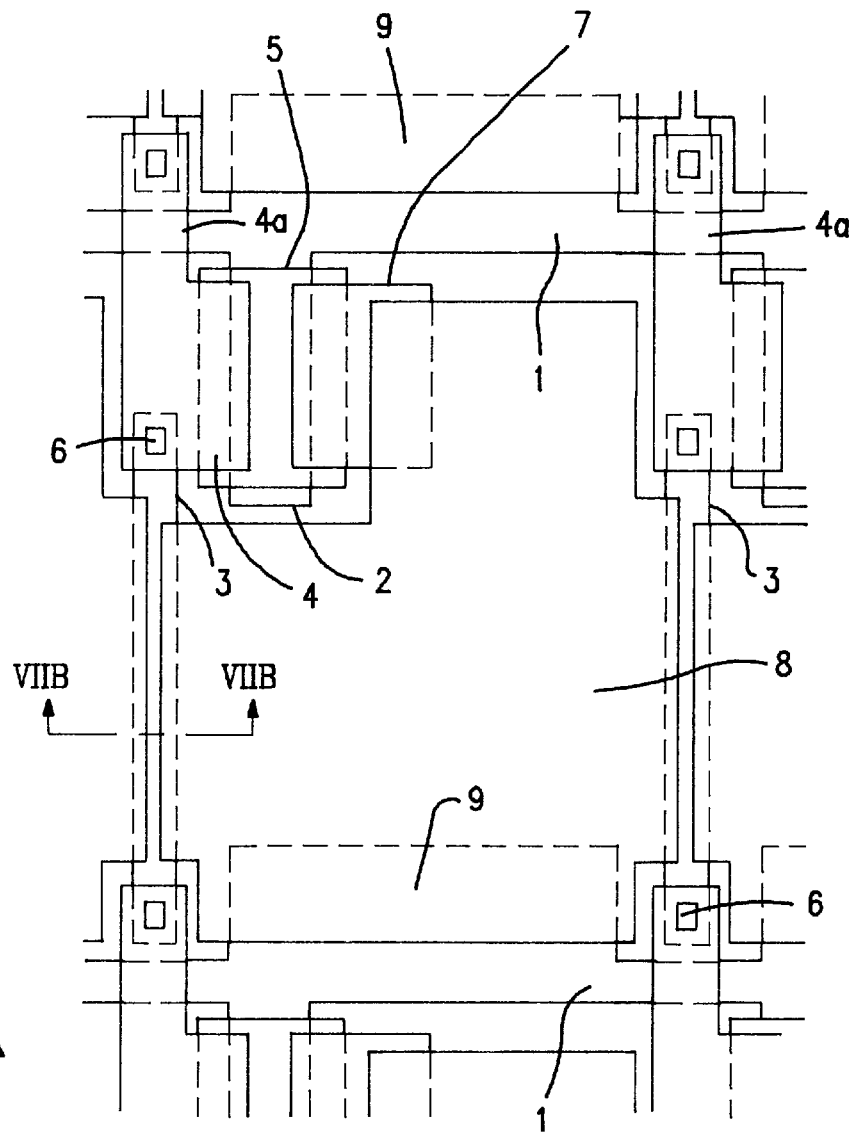
FIG. 7A is a plan view showing a liquid crystal device of a second embodiment of the present invention.
Figure 7B:
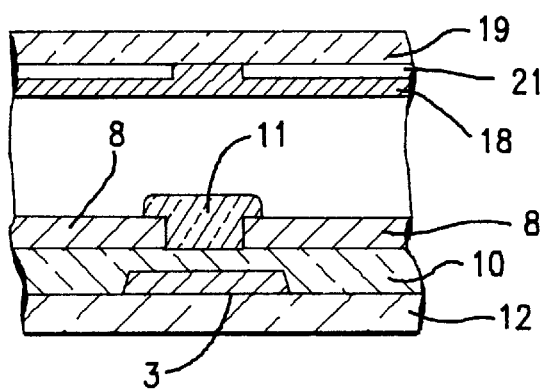
FIG. 7B is a sectional view taken along a line VIIB—VIIB of FIG. 7A.

As shown in FIGS. 7A and 7B, the LCD of the second embodiment is similar in constitution to that of the first embodiment, other than that the transparent pixel electrode 8 is formed so as to be overlapped with the drain electrode 3 formed of light shielding material partially in a portion of the periphery. Therefore, in the LCD of this embodiment the usage of the BM layer 20 to be formed between a color filter 21 on a facing substrate 19 on this portion can be advantageously omitted. In the prior art, BM layer 20 on the facing substrate 19 was formed with a large overlapping margin considering the limitation of the overlapping precision of the facing substrate 19 with the TFT substrate 12. In this embodiment, since the drain wiring 3 functions also as a light shielding layer by overlapping the edge of the transparent pixel electrode 8, the BM layer 20 of the facing substrate 19 is not needed in this overlapping region. The overlapping margin is not also required so that more increase in an opening ratio can be achieved than conventional.

Figure 4A:
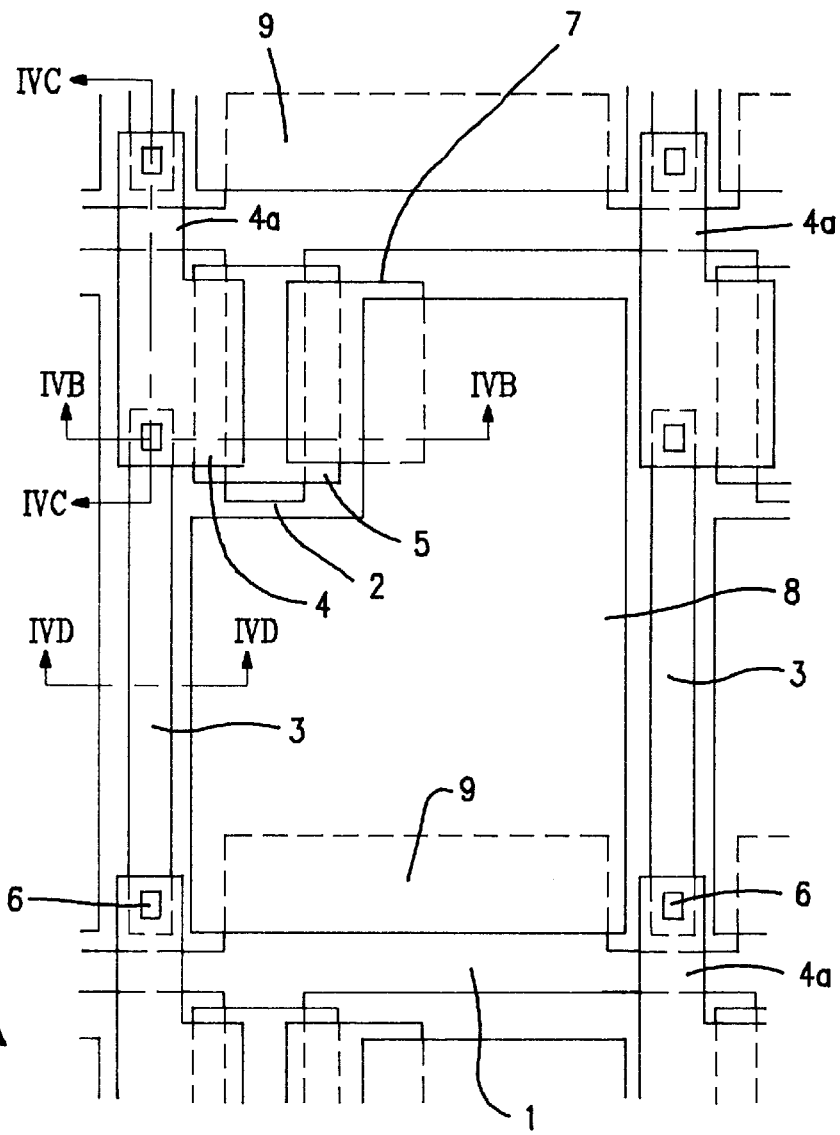
FIG. 4A is a plan view showing a liquid crystal device of a first embodiment of the present invention.
Figure 4B:
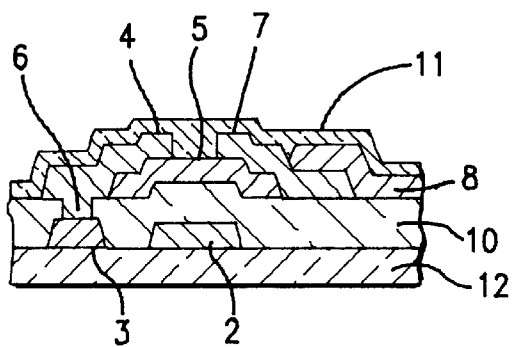
FIG. 4B is a sectional view taken along a line IVB—IVB of FIG. 4A.
Figure 4C:
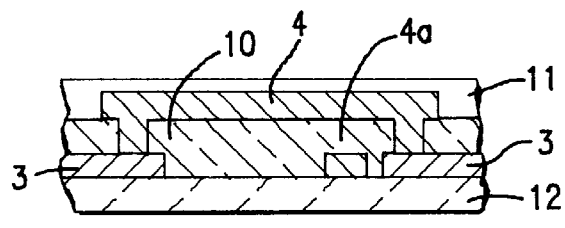
FIG. 4C is a sectional view taken along a line IVC—IVC of FIG. 4A.
Figure 4D:
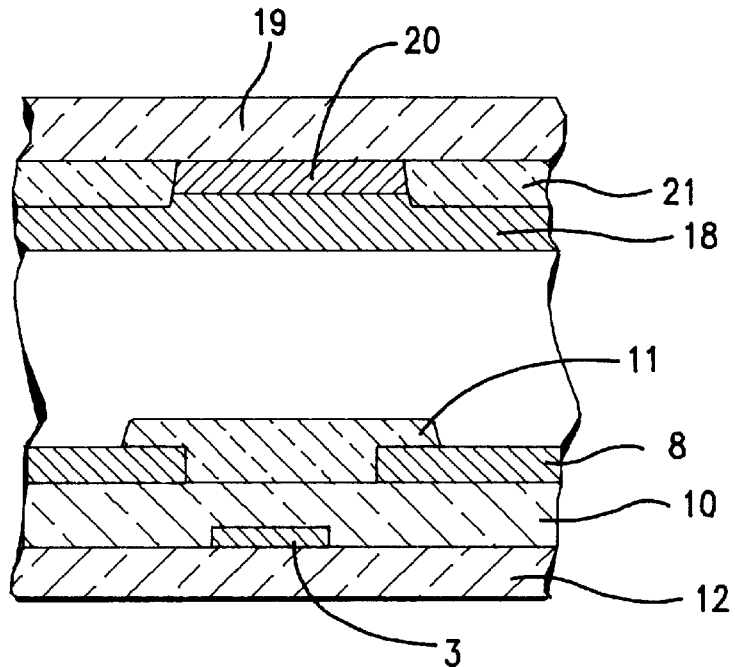
FIG. 4D is a sectional view taken along a line IVD—IVD of FIG. 4A.

If a width of the drain wiring 3 is made to be the same as the BM layer 20 shown in FIG. 4D, that portion of the BM layer is never needed. In addition, by forming the BM layer having a narrower width than the BM layer 20 shown in FIG. 4D, it is possible to form the conventional BM layer 20 so as to be narrower than conventional and use it. In order to make the BM layer 20 on the drain wiring 3 unnecessary, the drain wiring 3 must be altered to be wider so that a portion of the drain wiring adjacent to the transparent pixel electrode 8, which is at least connected to the transparent pixel electrode 8 via the thin film transistor, is overlapped with the transparent pixel electrode 8 and a portion of the drain wiring 3 adjacent to another transparent pixel electrode 8 extends to the edge of another transparent pixel electrode 8. In practical use, the width of the drain wiring 3 should be desirably set such that the drain wiring 3 overlaps with both transparent pixel electrodes 8 with a small margin.

As described above, in the present invention the drain wiring 3 in a region in the neighborhood of the transparent pixel electrode 8 is disposed so as to be the same layer as the gate wiring 1 under the insulating film 10, and a portion of the drain wiring 3 at a region crossing the gate electrode 2 is disposed so as to be the same layer as the drain electrode 4 so that the drain wiring 3 strides over the gate wiring 1 whereby a penetration of the disclination to the pixel electrode can be controlled. Furthermore, by forming the drain wiring 3 and the transparent pixel electrode 8 such that both overlap each other, the disclination is shielded by the drain wiring 3 thereby omitting the BM layer 20 at that portion. This leads to an increase in an area of the transparent pixel electrode 8 so that the opening ratio is advantageously increased.

It should be noted that in the LCDS of the first and second embodiments, a plurality of transparent pixel electrodes, a plurality of thin film transistors, a plurality of gate wirings, disposed in parallel, and a plurality of drain wirings disposed perpendicular thereto are arranged in a matrix fashion, as a matter of course.

While the embodiments of the present invention, as herein disclosed, constitute a preferred form, it is to be understood that other forms might be adopted.

What is claimed is:

1. A liquid crystal display device comprising:

a gate electrode and a drain wiring on a transparent substrate, and a gate wiring connected to said gate electrode;

an insulating film disposed on said gate electrode, said gate wiring, and said drain wiring;

a semiconductor thin film disposed on said insulating film;

source and drain electrodes disposed on said insulating film, each being connected to said semiconductor thin film, said drain electrode being connected to said drain wiring via a contact hole formed in said insulating film; and a transparent pixel electrode disposed on said insulating film so as to be connected to said source electrode, said transparent pixel electrode partially overlapping said drain wiring with said insulating film interposed therebetween.

2. A liquid crystal display device according to claim 1, wherein said drain wiring is formed of a light shielding metal.

3. A liquid crystal display device according to claim 2, wherein a width of said drain wiring is set such that one side of said drain wiring overlaps with said transparent pixel electrode with said insulating film interposed therebetween and the other side of said drain wiring extends to a terminal portion of another transparent pixel electrode with said insulating film interposed therebetween, said terminal portion of said another transparent pixel electrode being at a position vertically corresponding to said other side of said drain wiring.

4. A liquid crystal display device comprising:

a switching element on a first transparent substrate;

a wiring made of a light shielding metal connected to a first electrode of said switching element;

an insulating film formed on said wiring;

a transparent pixel electrode formed on said insulating film and being connected to a second electrode of said switching element, said transparent pixel electrode overlapping said wiring such that a width of said wiring is set so that one side of said wiring overlaps with said transparent pixel electrode with said insulating film interposed therebetween and the other side of said wiring overlaps a terminal portion of another transparent pixel electrode with said insulating film interposed therebetween; and a liquid crystal sandwiched between a second transparent substrate having a facing electrode and said first transparent substrate.

5. A liquid crystal display device according to claim 4, wherein said wiring is formed of a light shielding metal.

6. In a liquid crystal display device wherein a plurality of transparent pixel electrodes, a plurality of thin film transistors, a plurality of gate wirings arranged in parallel in a direction X, and a plurality of drain wirings arranged in parallel to a direction Y perpendicular to said direction X are arranged in a matrix fashion, the improvement wherein an insulating film is provided on a transparent substrate, said plurality of the transparent pixel electrodes are disposed on said insulating film, and said plurality of the drain wirings are disposed under said insulating film such that one side of said drain wiring are overlapped with one of said transparent pixel electrodes and the other side of said drain wiring are overlapped with another one of said transparent pixel electrodes which are arranged in said direction X so that a pair of overlapping regions of said drain wiring and said transparent pixel electrodes are elongating in said direction Y.

* * * * *